US011953706B2

(12) United States Patent
Chen-Ho et al.

(10) Patent No.: US 11,953,706 B2
(45) Date of Patent: Apr. 9, 2024

(54) PATTERNED WAVELENGTH-SELECTIVE IMAGE

(71) Applicant: 3M INNOVATIVE PROPERTIES COMPANY, St. Paul, MN (US)

(72) Inventors: Kui Chen-Ho, Woodbury, MN (US); Kenneth L. Smith, White Bear Lake, MN (US); Douglas S. Dunn, Woodbury, MN (US); Tien Yi T. H. Whiting, St. Paul, MN (US); John A. Wheatley, Stillwater, MN (US); Bryan T. Whiting, St. Paul, MN (US); Taylor J. Kobe, Woodbury, MN (US); Anthony F. Schultz, Forest Lake, MN (US); Duane D. Fansler, Dresser, WI (US); Jonah Shaver, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 627 days.

(21) Appl. No.: 17/262,042

(22) PCT Filed: Jul. 23, 2019

(86) PCT No.: PCT/IB2019/056301
§ 371 (c)(1),
(2) Date: Jan. 21, 2021

(87) PCT Pub. No.: WO2020/021458
PCT Pub. Date: Jan. 30, 2020

(65) Prior Publication Data
US 2021/0286111 A1    Sep. 16, 2021

Related U.S. Application Data

(60) Provisional application No. 62/702,616, filed on Jul. 24, 2018.

(51) Int. Cl.
*G02B 5/20* (2006.01)
*G02B 5/08* (2006.01)
(Continued)

(52) U.S. Cl.
CPC ............. *G02B 5/0816* (2013.01); *G02B 5/12* (2013.01); *G02B 5/208* (2013.01); *G02B 5/22* (2013.01);
(Continued)

(58) Field of Classification Search
CPC . G02B 5/12; G02B 5/208; G02B 5/22; G02B 1/14; G02B 5/20; G02B 5/203;
(Continued)

(56) References Cited

U.S. PATENT DOCUMENTS 1,591,572 A   7/1926  Stimson
3,190,178 A   6/1965  McKenzie
(Continued)

FOREIGN PATENT DOCUMENTS

JP    2014205247 A    10/2014
WO   WO 1995-017692    6/1995
(Continued)

OTHER PUBLICATIONS

International Search Report for PCT International Application No. PCT/IB2019/056301, dated Dec. 19, 2019, 3 pages.

*Primary Examiner* — Arnel C Lavarias

(57) ABSTRACT

Wavelength-selective films are visibly apparent under the selective wavelength. Wavelength-selective films typically reflect off axis the selected wavelength and therefore can provide high-contrast against a background when applied in a pattern on a substrate. However, it is difficult to apply unique patterned embedded images from film. Disclosed is a cost-effective method and construction of a patterned wavelength-selective image to a substrate. In the disclosed
(Continued)

wavelength-selective image, wavelength-selective film particles are applied to an adhesive pattern to create the wavelength-selective image.

15 Claims, 3 Drawing Sheets

(51) Int. Cl.
*G02B 5/12* (2006.01)
*G02B 5/22* (2006.01)
*G09F 3/00* (2006.01)
*G09F 3/02* (2006.01)

(52) U.S. Cl.
CPC .... *G09F 2003/0225* (2013.01); *G09F 3/0294* (2013.01); *G09F 3/0298* (2013.01)

(58) Field of Classification Search
CPC ......... G02B 5/206; G02B 5/26; G09F 3/0294; G09F 3/0298; G09F 2003/0225; G09F 3/0291; G09F 3/0292; G09F 3/0297; G09F 3/08; G09F 3/10
USPC ........ 359/359, 350, 360, 361, 546; 428/343; 427/207.1
See application file for complete search history.

(56) References Cited

U.S. PATENT DOCUMENTS

| 4,025,159 | A | 5/1977 | McGrath |
|---|---|---|---|
| 4,588,258 | A | 5/1986 | Hoopman |
| 4,775,219 | A | 10/1988 | Appledorn |
| 5,066,098 | A | 11/1991 | Kult |
| 5,138,488 | A | 8/1992 | Szczech |
| 5,450,235 | A | 9/1995 | Smith |
| 5,557,836 | A | 9/1996 | Smith |
| 6,024,455 | A | 2/2000 | O'Nill |
| 6,565,697 | B1 | 5/2003 | Maercklein |
| 6,883,908 | B2 | 4/2005 | Young |
| 8,792,165 | B2 | 7/2014 | Merrill |
| 8,865,293 | B2 | 10/2014 | Smithson |
| 9,498,931 | B2 | 11/2016 | Jacobs et al. |
| 9,581,740 | B2 | 2/2017 | Smithson |
| 9,726,790 | B2 | 8/2017 | Boyd et al. |
| 2005/0153107 | A1 | 7/2005 | Tijima |
| 2006/0234040 | A1* | 10/2006 | Liu .............................. C09J 7/22 428/40.1 |
| 2008/0198461 | A1 | 8/2008 | Nomura |
| 2009/0004419 | A1 | 1/2009 | Cok |
| 2010/0177380 | A1 | 7/2010 | Nagahama |
| 2013/0330486 | A1* | 12/2013 | Shields .................... G09G 3/34 428/29 |
| 2015/0317923 | A1 | 11/2015 | Edmonds et al. |

FOREIGN PATENT DOCUMENTS

| WO | WO 1996-035196 | 11/1996 |
|---|---|---|
| WO | WO 2017-034879 | 3/2017 |
| WO | WO 2017-132055 | 8/2017 |
| WO | WO 2018-064198 | 4/2018 |
| WO | WO 2018-064208 | 4/2018 |
| WO | WO 2018-064212 | 4/2018 |
| WO | WO 2018-178802 | 10/2018 |
| WO | WO 2018-178803 | 10/2018 |

* cited by examiner

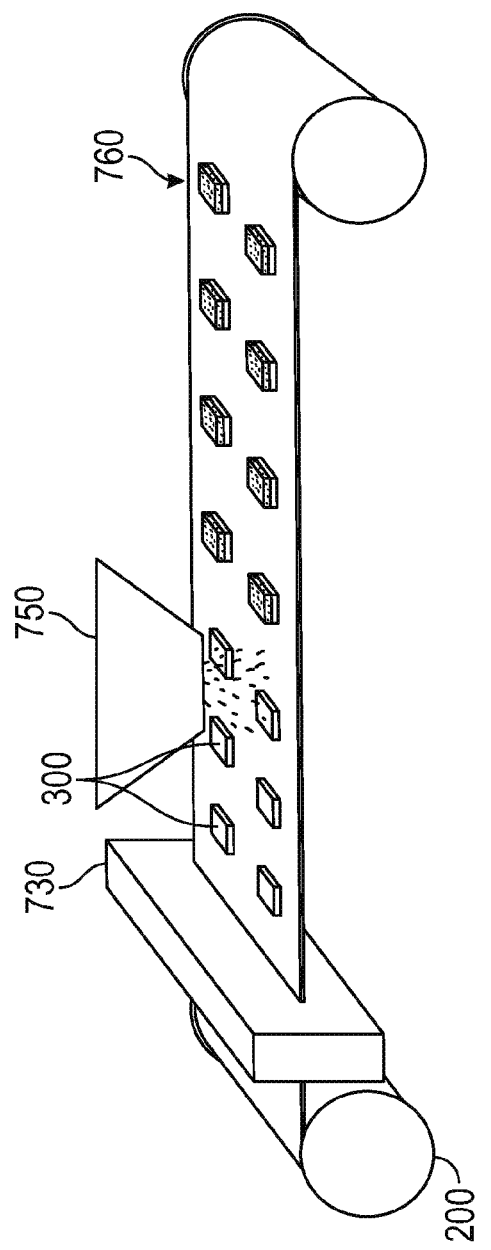

PATTERNED WAVELENGTH-SELECTIVE IMAGE

CROSS REFERENCE TO RELATED APPLICATIONS

This application is a national stage filing under 35 U.S.C. 371 of PCT/IB2019/056301, filed Jul. 23, 2019, which claims the benefit of Provisional Application No. 62/702,616, filed Jul. 24, 2018, the disclosure of both applications is incorporated by reference in their entirety herein.

TECHNICAL FIELD

The present disclosure relates to a patterned wavelength-selective image, a light-directing article with a patterned wavelength-selective image, and a method of making a patterned wavelength-selective image.

BACKGROUND

Wavelength-selective materials can be used to impart an image on a substrate, such as, for example a bar code. U.S. Pat. No. 8,865,293 discloses embedding infrared-detectable images on a light directing film. Light directing articles have an ability to manipulate incoming light and typically include an optical element such as a bead or prism. Retroreflective articles are light directing articles that include at least a retroreflecting element. Retroreflective elements reflect incident light back towards the direction of the light source. Retroreflecting elements include cube-corner prismatic retroreflectors and beaded retroreflectors. Retroreflective articles are used for road signs, license plates, and pavement markings because they are visibly apparent to the driver in daytime and nighttime when illuminated by the vehicle. Placement of detectable images on a retroreflective film allows for the embedded images to be seen in both daytime and nighttime conditions.

SUMMARY

Wavelength-selective films are visibly apparent under the selective wavelength. Wavelength-selective films typically reflect off axis, absorb, or scatter the selected wavelength and therefore can provide high-contrast against a background when applied in a pattern on a substrate. However, it is difficult to apply unique patterned embedded images from film. Disclosed is a cost-effective method and construction of a patterned wavelength-selective image to a substrate. In the disclosed wavelength-selective image, wavelength-selective film particles are applied to an adhesive pattern to create the wavelength-selective image.

In one embodiment, the patterned wavelength-selective article comprises a substrate, an adhesive pattern at a first region of the substrate, and a plurality of wavelength-selective film particles at the patterned adhesive forming the image. In one embodiment, the substrate is a light directing substrate. In one embodiment, the adhesive pattern is on the substrate. In one embodiment, the article further comprises a transparent layer, wherein the adhesive pattern is on the substrate and the wavelength-selective film particles are between the transparent layer and the substrate. In one embodiment, the article further comprises a transparent layer, wherein the adhesive pattern is on the transparent layer and the wavelength-selective film particles are between the transparent layer and the substrate.

In one embodiment, the wavelength-selective film particles are at a surface of the adhesive. In one embodiment, the wavelength-selective film particles are distributed throughout the adhesive. In one embodiment, the wavelength-selective film particles are transparent in the visible light spectrum. In one embodiment, the wavelength-selective film particles are reflective in a light spectrum outside the visible light spectrum. In one embodiment, the wavelength-selective film particles are reflective in the infrared (IR) or near infrared light spectrum. In one embodiment, the wavelength-selective film particles each is a multi-layer optical film having its longest length less than 25 millimeters.

In one embodiment, the adhesive is a material transparent in the visible light spectrum and transparent in the light spectrum that corresponds with the wavelength-selective film particles. In one embodiment, the article comprises discrete adhesive regions. In one embodiment, the article comprises a continuous adhesive with portions covered with a mask to form the exposed adhesive pattern. In one embodiment, the article further comprises an encapsulation adhesive surrounding the adhesive and wavelength-selective film particles. In one embodiment, the adhesive is in a unique pattern. In one embodiment, the unique pattern is a barcode.

In one embodiment, a process for making a patterned wavelength-selective article comprises providing a substrate, providing a plurality of wavelength-selective film particles, forming an adhesive in a pattern with the wavelength-selective film particles at a first region of the light directing article. In one embodiment, the substrate is a light directing substrate. In one embodiment, the light directing substrate comprises optical elements. In one embodiment, the light directing substrate comprises retroreflective optical elements.

In one embodiment, the adhesive is applied to the substrate. In one embodiment, a pattern of adhesive is applied to the substrate at the first region to form the adhesive in the pattern. In one embodiment, a continuous coating of adhesive is applied to the substrate with portions masked to form the adhesive in the pattern.

In one embodiment, the process further comprises applying a transparent layer such that the wavelength-selective film particles are between the transparent layer and the substrate. In one embodiment, the adhesive is applied to a transparent layer such that the wavelength-selective film particles are between the transparent layer and the substrate. In one embodiment, the wavelength-selective film particles are applied to a surface of the adhesive. In one embodiment, the wavelength-selective film particles are distributed throughout the adhesive.

In one embodiment, a patterned wavelength-selective article comprises a substrate, an adhesive pattern at a first region of the article, a plurality of wavelength-selective film particles at the patterned adhesive, wherein the wavelength-selective film particles comprise a multilayer optical film that is transparent in the visible light spectrum and reflective in the infrared or near infrared light spectrum. In one embodiment, the substrate is a light directing substrate, retroreflective substrate, protective layer, or carrier film. In one embodiment, the adhesive pattern is a material transparent in the visible light spectrum and transparent in the infrared or near infrared light spectrum. In one embodiment, the adhesive is in a unique pattern. In one embodiment, the light directing article further comprises an encapsulation adhesive surrounding the patterned adhesive and wavelength-selective film particles.

BRIEF DESCRIPTION OF DRAWINGS

FIG. 7 is a side sectional view of one embodiment of a process for making a substrate with a patterned wavelength-selective image.

Figure 1A:
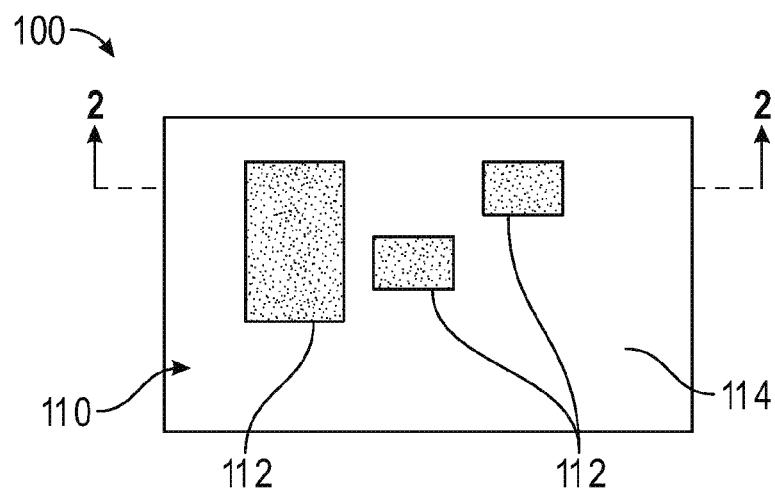
FIG. 1A is a front view of one embodiment of a substrate with a patterned wavelength-selective image apparent in a first lighting condition.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

The light directing article 100 has a substrate 200 with an adhesive 300 at a first area 112 and wavelength-selective film particles 400 applied to the adhesive 300. Therefore, the wavelength-selective film particles 400 forms a pattern 112 on the light directing article 100. Second area 114 does not include wavelength-selective film particles 400.

FIG. 1A is a front view of one embodiment of a light directing article 100 with wavelength-selective film particles 400 in a pattern 112 on the first major surface 110 of a substrate 200. The lighting conditions in FIG. 1A are the matching wavelength to achieve a response from the wavelength-selective film particles 400 and provide contrast between the wavelength-selective film particles 400 in the pattern 112 and the second area 114 that does not include the wavelength-selective film particles 400. In one embodiment, the wavelength-selective film particles 400 are responsive in the infrared or near infrared light spectrum. In one embodiment, the wavelength-selective film particles 400 are responsive in the ultraviolet light spectrum.

Figure 1B:
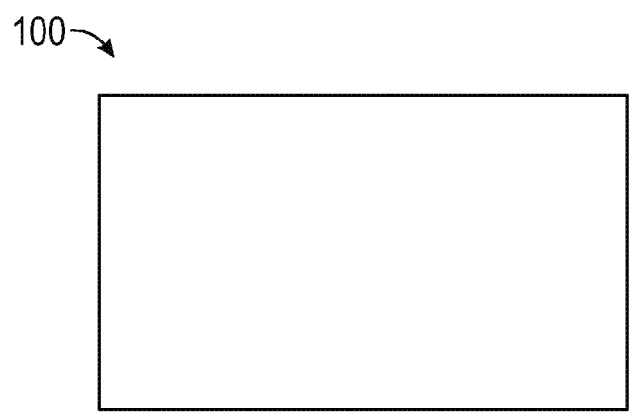
FIG. 1B is a front view of the patterned wavelength-selective image from FIG. 1A with the wavelength-selective image not apparent in a second lighting condition.

FIG. 1B is a front view of the light directing article 100 from FIG. 1A under a different lighting condition than shown in FIG. 1A. In this embodiment, the lighting condition is not a matching wavelength to achieve a response from the wavelength-selective film particles 400 and therefore the pattern area 112 with the wavelength-selective film particles 400 is not distinctly apparent from the second area 114 that does not include the wavelength-selective film particles 400. In one embodiment, the lighting condition in FIG. 1B is in the visible light spectrum. In one embodiment, the wavelength-selective film particles 400 are transparent in the visible light spectrum.

The substrate 200 that supports the wavelength-selective film particles 400 can be any known material for supporting the wavelength-selective film particles 400 such as rigid or flexible paper, films, foil, plastics, metals, or composite materials. In one embodiment, the substrate 200 is a light directing substrate or an optically active substrate that manipulates light. In some embodiment, the optically active substrate comprises optical elements. Examples of optical elements include glass or ceramic bead, prisms, cube corner elements, microlenses, and other microstructured elements. For example, in one embodiment, the substrate 200 is retroreflective and therefore generally directs incoming light back towards the direction of the light source. A retroreflective substrate will return incoming light to improve the detectability of the pattern formed by the first areas 112 with improved contrast between the first areas 112 with wavelength-selective material particles 400 and the second areas 114 without the wavelength-selective material.

An example is described for the embodiment shown in FIGS. 1A and 1B, in the case that the substrate 200 is retroreflective and the wavelength-selective film particles 400 are visibly transparent and IR-reflective. When the light directing article 100 is exposed to an infrared light source as shown in FIG. 1A, the IR light at the second areas 114 retroreflects back to the light source so that the second areas 114 appears bright, while the first areas 112 containing the wavelength-selective film particles appear dark since the IR light at the first areas 112 is reflected off-axis by the wavelength-selective film particles and not returned back towards the direction of the light source. Under visible light conditions, as shown in FIG. 1B, the visible light passes substantially through the wavelength-selective film particles and is retroreflected over the whole surface of the light directing article 100 making the light directing article appear uniformly bright in the retroreflected light.

Figure 2:
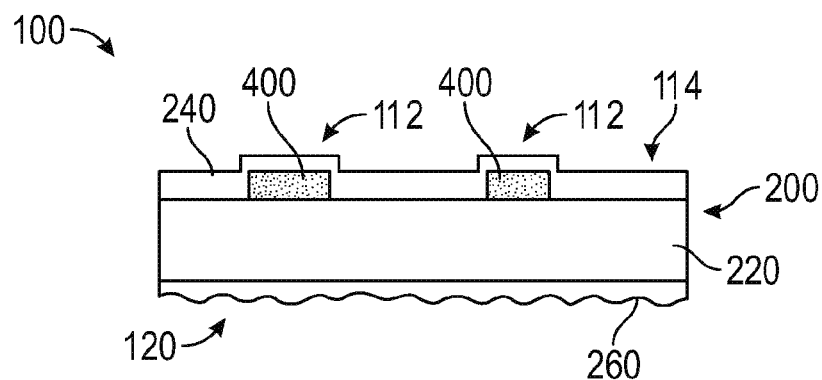
FIG. 2 is a side sectional view of the substrate with the patterned wavelength-selective image of FIG. 1A through line 2-2.

FIG. 2 is a side sectional view of the light directing article 100 of FIG. 1A through line 2-2. The light directing article 100 includes a substrate 200 with the patterned wavelength-selective film particles 400 at the first area 112 on the first major surface 110 of the light directing article 100. Second area 114 on the first major surface 110 of the light directing article 100 does not include the wavelength-selective film particles 400. Substrate 200 in this embodiment comprises an optically active substrate 220, such as a retroreflective material. An adhesive 300, not shown in FIG. 2, is used to secure the wavelength-selective film particles 400 to the light directing article, as will be discussed in more detail in the embodiments shown in the figures below.

As shown in FIG. 2 an optional securing adhesive 260 may be included on the second major surface 120 of the light directing article 100 to secure the light directing article 100 to another object. Optionally, a protective layer 240 may be at the outermost surface of the light directing article 100. As shown in FIG. 2, the wavelength-selective film particles 400 are protected from possible damage by being positioned between the substrate 200 and the protective layer 240.

Figure 3:
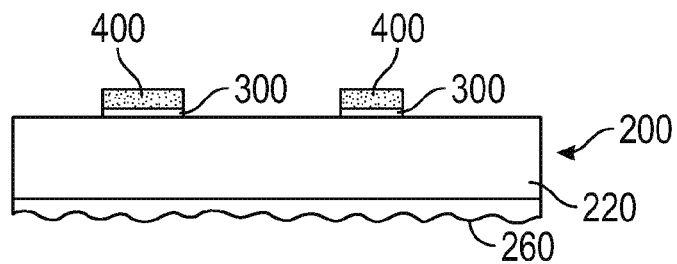
FIG. 3 is a side sectional view of one embodiment of a substrate with an adhesive pattern and patterned wavelength-selective image, wherein in this embodiment the substrate is a light directing substrate.

FIG. 3 is a side sectional view of one embodiment of a light directing article 100 of FIG. 1A through line 2-2 with the adhesive 300 between the substrate 200 and the wavelength-selective film particles 400. In the embodiment in FIG. 3, the substrate 200 may be an optically active substrate 220 like a retroreflective substrate.

Figure 4:
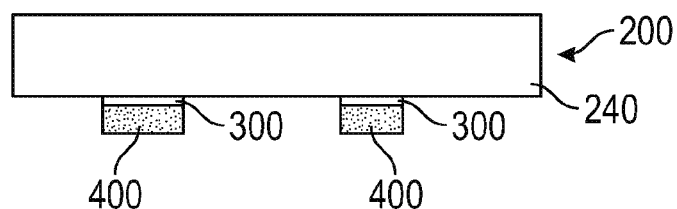
FIG. 4 is a side sectional view of one embodiment of a substrate with an adhesive pattern and patterned wavelength-selective image, wherein in this embodiment the substrate is a film.
Figure 5:
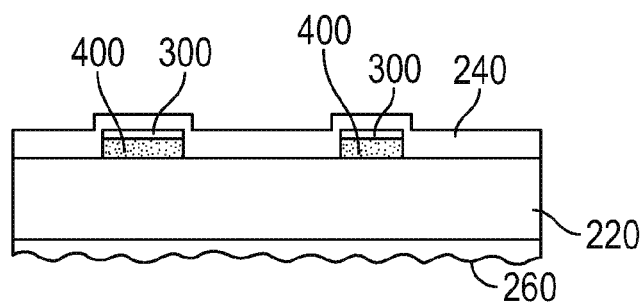
FIG. 5 is a side sectional view of one embodiment of the substrate from FIG. 4 applied to a light directing substrate.

FIG. 4 is a side sectional view of one embodiment of a light directing article 100 of FIG. 1A through line 2-2. In this embodiment, substrate 200 is a transparent layer 240, which is substantially transparent in the wavelength range that corresponds with the wavelength-selective film particles 400. In some instances, the transparent layer 240 can be a protective layer protecting the underlying materials from elements such as ultraviolet light, mechanical damage, or water encroachment. The adhesive 300 is between the transparent layer 240 and the wavelength-selective film particles 400. Typically, in a construction such as shown in FIG. 4, the transparent layer 240 containing the wavelength-selective film particles 400 is applied to another substrate. For example, FIG. 5 is a side sectional view of the substrate 240 from FIG. 4 applied to another substrate 220, which may be an optically active substrate like a retroreflective substrate. A securing adhesive layer (not shown) may be included between the wavelength-selective film 400 and the substrate 220 to secure the wavelength-selective film particles 400 to the substrate 220.

Figure 6:
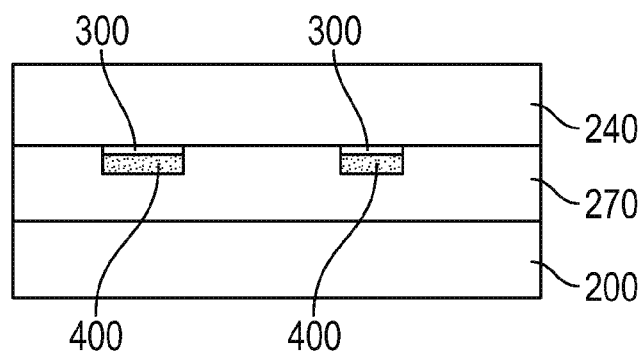
FIG. 6 is a side section view of one embodiment of the substrate from FIG. 4 with adhesive encapsulating the wavelength-selective film particles.

The securing adhesive layer can be a continuous or patterned adhesive layer. The securing adhesive layer can be an encapsulation adhesive. FIG. 6 is a side sectional view of one embodiment of a light directing article 100 like shown and described in FIG. 4 where the adhesive 300 and wavelength-selective film particles 400 are encapsulated into an adhesive layer 270. Although the adhesive 300 is shown applied to one substrate layer 240, it is understood that the adhesive 300 could be applied to any substrate, such as substrate 200 and then any additional adhesive, substrates can be overlying.

The adhesive 300 forms the pattern 112. In the embodiments shown in FIGS. 2-6, the adhesive 300 is in discrete areas to form the pattern 112. Alternatively, the adhesive 300 may be a continuous coating with portions masked to reveal a pattern 112 of adhesive 300.

FIG. 7 is side sectional view of one embodiment of a process for making a substrate 200 with patterned wavelength-selective film particles 400. The substrate 200 is provided. Print station 730 applies the adhesive 300 onto the substrate 200. Adhesive application can be by any number of known adhesive pattern coating techniques. For example, if a regular repeating pattern of adhesive 300 is desirable, then any pattern coating or printing process such as rotary printing, gravure printing, screen printing, or flexographic printing can be used to apply the adhesive 300 to the substrate 200. In one embodiment, it may be desirable to create unique patterns of adhesive 300. Therefore, a digital printing process such as inkjet printing can be used to apply the adhesive 300 to the substrate 200. Following application of the adhesive 300 to the substrate 200, the wavelength-selective film particles 400 are applied to the adhesive 300 on the substrate 200 from hopper 750. The patterned substrate 760 can be rolled for further use or converting.

In an alternative embodiment, the adhesive 300 could be loaded with the wavelength-selective film particles 400. Then, at the print station 730, the adhesive 300 containing the wavelength-selective film particles 400 is applied to the substrate. In this embodiment, the hopper 750 is not necessary.

In an alternative embodiment, the adhesive 300 is fully coated onto the substrate 200, then at the print station 730 a mask is applied to portion of the adhesive 300 so that the un-masked area forms the pattern 112.

Multiple cost-efficient advantages can be obtained with the processes described above. For example, it is not necessary to register the wavelength-selective film particles 400 to the patterned adhesive 300. As described, the wavelength-selective film particles 400 will follow the location of the adhesive 300 to form the desired pattern.

Wavelength-selective film particles 400 provide a response at a given wavelength. These wavelength-selective film particles 400 can be formed from film that has been cut to fine particles. Therefore, the particles will generally have at least some outer surface that are in a flat plane. In one embodiment, the longest dimension of a wavelength-selective film particle is less than 25 millimeters. In one embodiment, the longest dimension of a wavelength-selective film particle is greater than 100 micrometers. In one embodiment, the longest dimension of a wavelength-selective film particle is less than 25 millimeters and greater than 100 micrometers.

It is understood that more than one wavelength-selective material can be used on any one particular light directing article 100. For example, in one embodiment a first set of wavelength-selective film particles 400 that is responsive in a first light spectrum, such as infrared light, and visibly transparent can be used in one portion of the light directing article 100, and a second set of wavelength-selective film particles 400 that is responsive in a second light spectrum, such as ultraviolet light, and visibly transparent can be used on either the same areas or a different area of the light directing article 100.

In one embodiment, the wavelength-selective film particles 400 may be formed from any film processed into particles that provides a response at a given wavelength. In one embodiment, the wavelength-selective film particles 400 are a multilayer optical film cut into a particle. For example, the multilayer optical film to be cut into particles is an infrared-reflecting material. The multi-layer optical film chosen for any specific implementation will depend on the desired optical, structural, and durability characteristics. As such, desirable multi-layer optical films will vary based on the intended application. Some exemplary multi-layer optical films are described in, for example, U.S. Pat. No. 6,024,455 and PCT Publication No. WO 95/17692. Exemplary commercially available multi-layer optical films include, for example, 3M Solar Reflective Film, manufactured by 3M Company of St. Paul. The transmission spectrum of a particular multi-layer optical film depends, in part, on the optical thickness of the individual layers along the various axes, and is substantially determined by the well-known Fresnel coefficient. Films can be designed to reflect infrared, visible, or ultraviolet light by choice of the appropriate optical thicknesses. Films may also be designed to exhibit a spectral shift in percent reflectance and transmission as a function of entrance angle of incident light. Consequently, visibility of the infrared-reflecting material may differ based on the angle at which the optically active article is viewed. The desired relationship between refractive indices of the individual layers can be achieved by selection of appropriate materials and appropriate processing conditions.

In one embodiment, the wavelength-selective film particles 400 are fragments from a transfer article, which is a multilayer construction having a very thin wavelength-selective outer layer easily separated from underlying layers. Transfer articles are described in PCT patent application titled "Transfer Articles" PCT/IB2018/051832 filed on Mar. 19, 2018, and PCT patent application titled "Transfer Articles" PCT/IB2018/051833, the disclosures of which are herein incorporated by reference.

These transfer articles comprise a release layer that is a metal layer or a doped semiconductor layer, an acrylate layer overlaying the release layer, and the wavelength-selective function layer overlaying the acrylate layer. In these constructions the wavelength-selective function layer can be very thin and easily breakable. In some embodiments, the wavelength-selective function layer is 0.03 to 5 microns thick. The acrylate and wavelength-selective functional layer release from the release layer and so released fragments of the wavelength-selective functional layer form wavelength-selective film particles 400.

In one embodiment, wavelength-selective film particles 400 are cut film additionally coated or embedded with another wavelength-selective material, such as, for example, pigments, dyes, pearlescent pigments, coated mica, surface coated ceramic beads, or other materials containing light absorbing, reflecting, or scattering properties.

In one wavelength, such as a visible wavelength, the transparency of the wavelength-selective film particles 400 can be >90%, >80%, >70%, >60%, >50%. In the other wavelength, such as IR, near-IR, or ultraviolet, the transparency of the wavelength-selective film particles 400 can be <40%, <30%, <20%, <10%, <5%.

In one embodiment, the wavelength-selective particles 400 are applied in a flat laydown position to achieve the best contrast. An example of a process used to achieve flat laydown is a high shear coating processes.

The substrate 200 chosen for any specific implementation will depend on the desired optical, structural, and durability characteristics. Various materials for substrate 200 will be described below, and these descriptions apply to substrate 200 as well as substrate 240 or any additional substrate, which were described above. Any number of substrates can be used in combination with other substrates to achieve desired characteristics.

As described above the substrate may be optically active. Optically active materials include polarizing, reflective, and retroreflective substrates. An optically active material may contain optical elements, such as microstructures, prisms, cube corners, microlenses, or glass or ceramic beads.

The term "retroreflective" as used herein refers to the attribute of reflecting an obliquely incident light ray in a direction antiparallel to its incident direction, or nearly so, such that it returns to the light source or the immediate vicinity thereof. Two known types of retroreflective sheeting are microsphere-based sheeting and cube corner sheeting (often referred to as prismatic sheeting). Microsphere-based sheeting, often referred to as "beaded" sheeting, employs a multitude of microspheres typically at least partially embedded in a binder layer and having associated specular or diffuse reflecting materials (e.g., pigment particles, metal flakes, vapor coats) to retroreflect incident light. Illustrative examples are described in, for example, U.S. Pat. No. 3,190,178 (McKenzie), U.S. Pat. No. 4,025,159 (McGrath), and U.S. Pat. No. 5,066,098 (Kult). Cube corner retroreflective sheeting, often referred to as "prismatic" sheeting, comprises a body portion typically having a substantially planar front surface and a structured rear surface comprising a plurality of cube corner elements. Each cube corner element comprises three approximately mutually perpendicular optical faces. Illustrative examples are described in, for example, U.S. Pat. No. 1,591,572 (Stimson), U.S. Pat. No. 4,588,258 (Hoopman), U.S. Pat. No. 4,775,219 (Appledorn et al.), U.S. Pat. No. 5,138,488 (Szczech), and U.S. Pat. No. 5,557,836 (Smith et al.). A seal layer may be applied to the structured surface to keep contaminants away from individual cube corners. Flexible cube corner sheetings, such as those described, for example, in U.S. Pat. No. 5,450,235 (Smith et al.) can also be incorporated in embodiments or implementations of the present application.

In some embodiments, the substrate is not optically active with optical elements as described above, but is a metal, foil, paper, or synthetic film and may be applied to yet another substrate, such as described in FIGS. 5 and 6. The substrate may be a transparent film, that may include materials such a vinyl, urethanes, acrylic, and other films or coatings that provide the desired durability, flexibility, elasticity. In embodiments where it is desired that in the visible light spectrum the wavelength-selective material is transparent, a visibly transparent film should be used. Further, so that the transparent film substrate 200 does not interfere with the detection of the wavelength-selective film particles 400, the transparent film substrate 200 should also be transparent in the wavelength range that corresponds with the wavelength-selective film particles 400.

In some embodiments, the substrate is a carrier film that receives the adhesive 300, but then allows for the transfer of the adhesive 300 to yet another substrate. Such a carrier film may be a release liner. The carrier film may be coated with a low adhesion material such that the adhesive 300 has a higher adhesion towards the final desired substrate than the carrier film. In some embodiments, the low adhesion material is a low surface energy material, such as silicones and fluorinated materials.

The adhesive 300 may be any suitable adhesive for the desired application. The adhesive 300 may be a hot melt adhesive requiring added heat and pressure to adhere to the desired substrates. The adhesive 300 may be a structural or semi-structural adhesive. The adhesive 300 may comprise an epoxy resin, a mixture of epoxy resins, a curing agent, tougheners, dispersants, or other additives. The adhesive 300 may comprise a mixture of phenolic resins, crosslinkers, curatives, rheology modifiers, or plasticizers.

The adhesive 300 may be a heat activated adhesive. For example, at certain temperatures the adhesive 300 does not have tack but when brought to an elevated temperature range the adhesive has tack. In one embodiment, at room temperature the heat activated adhesive does not have tack, but becomes tacky at elevated temperatures, such as greater than 33° C., greater than 48° C., or greater than 65° C.

The adhesive 300 may be a pressure sensitive adhesive, which is an adhesive that is permanently tacky at room temperature (such as exhibiting a tensile storage modulus that is less than 0.1 mega pascal at hertz at 25° C.), which adheres to a variety of surfaces with light pressure (finger pressure) with no phase change (such as liquid to solid). Exemplary pressure sensitive adhesives include crosslinked (meth)acrylic pressure-sensitive adhesives with or without tackifier. The adhesive 300 maybe blends of natural or synthetic rubber and resin, silicone or other polymer systems, with or without additives. The adhesive 300 may comprise a tackifier, plasticizer, crosslinker, or other additives such as antioxidant and ultraviolet light absorbers. In embodiments, where it is desired that in the visible light spectrum the wavelength-selective material is transparent, a visibly transparent adhesive should be used. Further, so that the adhesive 300 does not interfere with the detection of the wavelength-selective film particles 400, the adhesive 300 should also be transparent in the wavelength range that corresponds with the wavelength-selective film particles 400.

In one embodiment, the adhesive 300 provides at least 5 ounces per inch (oz/in), 10 oz/in, 15 oz/in, 20 oz/in, 25 oz/in, 30 oz/in peel adhesion between the wavelength-selective film particles and the light directing article.

Light directing articles 100 and especially light directing articles 100 that are retroreflective like the ones described herein may be useful in certain machine vision detection and sensing systems. A machine vision detection system collects light from each region of the light directing article with the goal of creating a difference (contrast) between the first are 112 and second area 114. The wavelength-selective material 400 can be arranged in a pattern to create a unique identifier, such as a bar code with encoded data.

As one example, as transportation infrastructure becomes more complicated, vehicles are gaining more driving autonomy. To navigate safely and effectively, sensing modules are increasingly incorporated into these vehicles to perform tasks from parking assistance, self-regulating cruise control and lane deviation warning, to fully autonomous navigation and driving, including collision avoidance and traffic sign interpretation. Camera sensors in combination with wavelength-specific light sources could be used to illuminate a light directing article 100 and detect the pattern formed by the wavelength-selective film particles 400. Further processing could decode the encoded data from the detected the pattern formed by the wavelength-selective material 400. The light in the driving environment can be divided into the following spectral regions: visible light in the region between about 400 and about 700 nm and light outside the visible light region. Existence of a human driver requires certain information to be read by the driver in the visible light spectrum, but it may also be desirable to have other information not visible to the driver. This can be achieved, for example, by using light outside the visible light region such as infrared and near-infrared light in the region between about 700 and about 1100 nm. Typical cameras have sensitivity that includes both of these ranges, although the sensitivity of a standard camera system decreases significantly for wavelengths longer than 1100 nm.

In one example, the light directing article 100 is used on a vehicle number plate to include a visibly transparent, machine detectable pattern that conveys information. In one example, the light directing article 100 may be used on a traffic sign, which is an article that conveys information, usually by means of alphanumeric characters, symbols, graphics, or other indicia. It would be advantageous in some applications to use the light directing article 100 to employ the desirable property of viewing indicia without changing the appearance of a signage under visible light. Such retroreflective articles would enable the reading of sign specific information meant for general consumption while avoiding driver or sign reader distraction by and/or unwanted detection of "covert" markings that become viewable with a light source and a detector set in a different wavelength region. These covert markings could be used for security purposes, identification, navigation, and inventory control. That inconspicuousness can be created with, for example, a visibly clear multi-layer optical film particles or multi-layer optical film particles having a color that approximates the color of the signage substrate. The covert indicia could assist in signage inventory control, as is described in, for example, PCT Publication No. WO 96/35196. For example, the covert indicia could contain signage-specific information such as, for example, signage material lot number, installation date, reorder information, positional information, or product life expectancy. For example, the wavelength-selective film particles 400 may be arranged in a pattern to provide information such as described in PCT publication 2018/064208; PCT publication 2018/064198; and PCT publication 2018/064212, the disclosures of which are herein incorporated by reference.

A retroreflective highway sign could include visibly transparent and infrared reflecting pattern attached to the retroreflective sheeting portion of the sign. Such attachment could occur, for example, during production, at the time of installation, or after installation. One advantage of such a sign is that the pattern does not interfere with the drivers fast reading of the sign as the driver drives past the sign because the indicia is not visible to the driver. But the indicia can be viewed by highway personnel or machines outfitted with an infrared camera. This identification can be used, for example, for communication of additional information to the vehicle automated driver assistance system or for communication of sign management functions such as maintenance requirements, logging of service life, reordering, providing navigation guidance, or to measure sign performance based on the information in the indicia.

Although specific embodiments have been shown and described herein, it is understood that these embodiments are merely illustrative of the many possible specific arrangements that can be devised in application of the principles of the invention. Numerous and varied other arrangements can be devised in accordance with these principles by those of skill in the art without departing from the spirit and scope of the invention. The scope of the present invention should not be limited to the structures described in this application, but only by the structures described by the language of the claims and the equivalents of those structures.

EXEMPLARY EMBODIMENTS

1. A light directing article with an image comprising:
   a substrate;
   an adhesive pattern at a first region of the substrate;
   a plurality of wavelength-selective film particles at the adhesive forming the image.
2. The light directing article of embodiment 1, wherein the substrate is an optically active substrate.
3. The light directing article of any one of the preceding embodiments, wherein the substrate is an optically active substrate comprising optical elements.
4 The light directing article of any one of the preceding embodiments, further comprising a transparent layer, wherein the adhesive pattern is on the substrate and the wavelength-selective film particles are between the transparent layer and the substrate.
5. The light directing article of any one of the preceding embodiments, wherein the substrate is a transparent layer, wherein the adhesive pattern is on the transparent layer and the wavelength-selective film particles are between the transparent layer and an optically active substrate.
6. The light directing article of any one of the preceding embodiments, wherein the wavelength-selective film particles are at a surface of the adhesive pattern.
7. The light directing article of any one of the preceding embodiments, wherein the wavelength-selective particles are distributed throughout the adhesive pattern.
8. The light directing article of any one of the preceding embodiments, wherein the wavelength-selective film particles are transparent in the visible light spectrum.
9. The light directing article of any one of the preceding embodiments, wherein the wavelength-selective film particles are reflective in a light spectrum outside the visible light spectrum.

10. The light directing article of any one of the preceding embodiments, wherein the wavelength-selective film particles are reflective in the infrared or near infrared light spectrum.

11. The light directing article of any one of the preceding embodiments, wherein the wavelength-selective film particles each is a multi-layer optical film having its longest length less than 25 millimeters.

12. The light directing article of any one of the preceding embodiments, wherein the adhesive pattern is in discrete regions.

13. The light directing article of any one of the preceding embodiments, wherein the adhesive pattern is from a continuous layer of adhesive with a mask applied to regions to expose the adhesive pattern.

14. The light directing article of any one of the preceding embodiments, wherein the adhesive is transparent in the visible light spectrum and transparent in the light spectrum that corresponds with the wavelength-selective film particles.

15. The light directing article of any one of the preceding embodiments, further comprising an encapsulation adhesive surrounding the patterned adhesive and wavelength-selective film particles.

16. The light directing article of any one of the preceding embodiments, wherein the adhesive pattern is in a unique pattern.

17. The light directing article of any one of the preceding embodiments, wherein the unique pattern is a barcode.

18. A process for making a light directing article comprising:
  providing a substrate;
  providing a plurality of wavelength-selective film particles;
  forming an adhesive in a pattern with wavelength-selective film particles at a first region of the substrate.

19. The process of embodiment 18, wherein the substrate is an optically active substrate.

20. The process of any one of embodiments 18-19, further comprising:
  applying a transparent layer such that the wavelength-selective film particles are between the transparent layer and the substrate.

21. The process of any one of embodiments 18-20, wherein the substrate is a transparent layer such that the wavelength-selective film particles are between the transparent layer and an optically active substrate.

22. The process of any one of embodiments 18-21, wherein discrete regions of adhesive are applied to the substrate to form the pattern.

23. The process of any one of embodiments 18-22, wherein a continuous coating of adhesive is applied to the substrate, and further comprising applying a mask to the adhesive to form the pattern.

24. The process of any one of embodiments 18-23, wherein the wavelength-selective film particles are applied to a surface of the adhesive.

25. The process of any one of embodiments 18-24, wherein the wavelength-selective film particles are distributed throughout the adhesive.

26. The process of any one of embodiment 18-25, wherein the wavelength-selective film particles are transparent in the visible light spectrum.

27. The process of any one of embodiments 18-26, wherein the wavelength-selective film particles are reflective in a light spectrum outside the visible light spectrum.

28. The process of any one of embodiments 18-27, wherein the wavelength-selective film particles are reflective in the infrared or near infrared light spectrum.

29. The process of any one of embodiments 18-28, wherein the wavelength-selective film particles each is a multi-layer optical film having its longest length less than 25 millimeters.

30. The process of any one of embodiments 18-29, wherein the adhesive is in a unique pattern.

What is claimed is:

1. A light directing article with an image comprising:
  a substrate;
  an adhesive pattern at a first region of the substrate;
  a plurality of wavelength-selective film particles at the adhesive forming the image.

2. The light directing article of claim 1, further comprising a transparent layer, wherein the adhesive pattern is on the substrate and the wavelength-selective film particles are between the transparent layer and the substrate.

3. The light directing article of claim 1, wherein the substrate is a transparent layer, wherein the adhesive pattern is on the transparent layer and the wavelength-selective film particles are between the transparent layer and an optically active substrate.

4. The light directing article of claim 1, wherein the wavelength-selective film particles are transparent in a visible light spectrum.

5. The light directing article of claim 1, wherein the wavelength-selective film particles are reflective in an infrared or near infrared light spectrum.

6. The light directing article of claim 1, wherein the adhesive pattern is from a continuous layer of adhesive with a mask applied to regions to expose the adhesive pattern.

7. The light directing article of claim 1, wherein the adhesive is transparent in a visible light spectrum and transparent in a light spectrum that corresponds with the wavelength-selective film particles.

8. The light directing article of claim 1, further comprising an encapsulation adhesive surrounding the patterned adhesive and wavelength-selective film particles.

9. The light directing article of claim 1, wherein the adhesive pattern is a barcode.

10. A process for making a light directing article comprising:
  providing a substrate;
  providing a plurality of wavelength-selective film particles;
  forming an adhesive in a pattern with wavelength-selective film particles at a first region of the substrate.

11. The process of claim 10, further comprising:
  applying a transparent layer such that the wavelength-selective film particles are between the transparent layer and the substrate.

12. The process of claim 10, wherein the substrate is a transparent layer such that the wavelength-selective film particles are between the transparent layer and an optically active substrate.

13. The process of claim 10, wherein the wavelength-selective film particles are transparent in a visible light spectrum.

14. The process of claim 10, wherein the wavelength-selective film particles are reflective in an infrared or near infrared light spectrum.

15. The process of claim 10, wherein the wavelength-selective film particles each is a multi-layer optical film having its longest length less than 25 millimeters.

\* \* \* \* \*